United States Patent

Krizek et al.

[11] Patent Number: 5,865,376
[45] Date of Patent: Feb. 2, 1999

[54] MULTIPLE NOZZLE WITH ONE-PIECE SEAL FOR WINDSHIELD WASHER SYSTEMS

[75] Inventors: Oldrich Krizek, Bietigheim-Bissingen; Frank Langenfelder, Heilbronn; Gerhard Oehler, Freudental; Eckhardt Schmid, Brackenheim, all of Germany

[73] Assignee: ITT Automotive Europe GmbH, Frankfurt, Germany

[21] Appl. No.: 569,250

[22] PCT Filed: Mar. 9, 1994

[86] PCT No.: PCT/EP94/00719

§ 371 Date: Jul. 12, 1996

§ 102(e) Date: Jul. 12, 1996

[87] PCT Pub. No.: WO95/00371

PCT Pub. Date: Jan. 5, 1995

[30] Foreign Application Priority Data

Jun. 26, 1993 [DE] Germany ............ 43 21 327.8

[51] Int. Cl.[6] ............................................. B05B 1/10
[52] U.S. Cl. ............................................. 239/284.1
[58] Field of Search ................ 239/284.1; 15/250.04, 15/250.01, 250.001

[56] References Cited

U.S. PATENT DOCUMENTS 3,940,068  2/1976  Mohnach et al. .......... 239/284.1
5,074,471  12/1991 Baumgarten et al. ....... 239/284.1

FOREIGN PATENT DOCUMENTS 2673154  8/1992  France .
1205405  11/1965 Germany .
1902564  6/1970  Germany .
2146890  3/1973  Germany .
2337774  3/1974  Germany .
3907980  9/1990  Germany .

Primary Examiner—Lesley D. Morris
Attorney, Agent, or Firm—J. Gordon Lewis; Thomas N. Twomey

[57] ABSTRACT

A nozzle element covering open channels through the use of a removable cover forming thus nozzles for a windshield washer system. A preferably flat seal elastically covers several apertures. Advantageous embodiments concern the division of the nozzle unit and the allocation of the seal to the channels ending at the apertures.

14 Claims, 4 Drawing Sheets

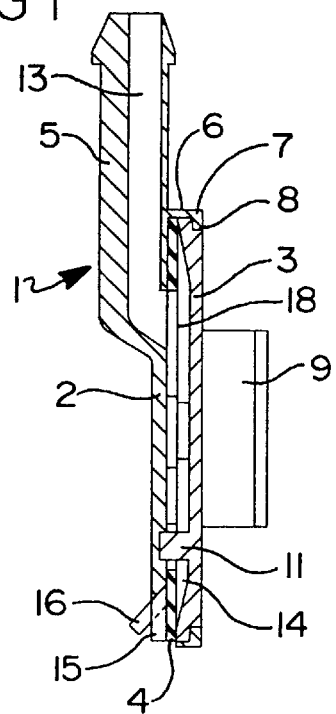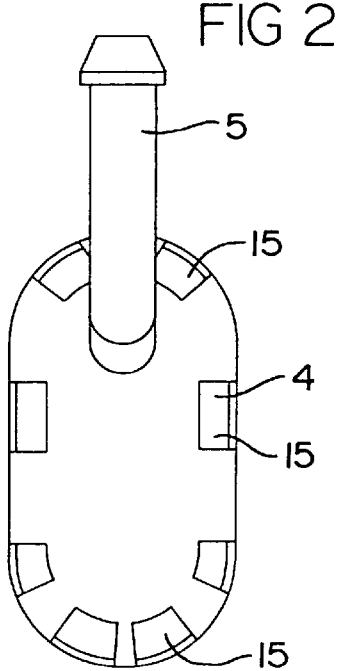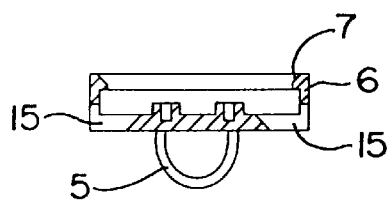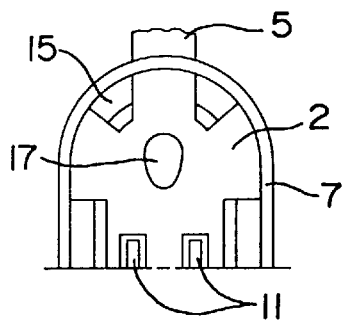

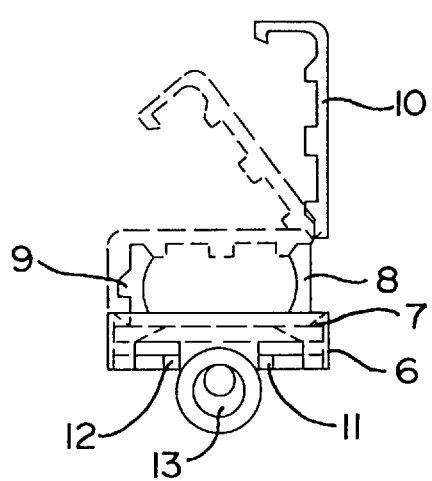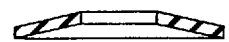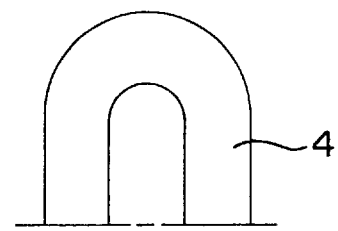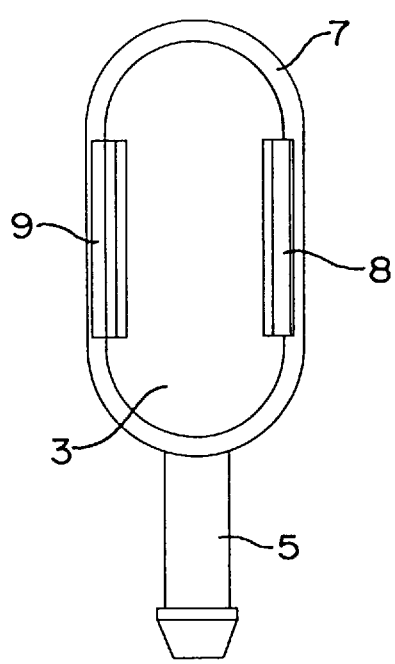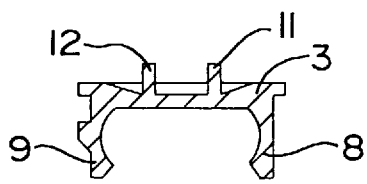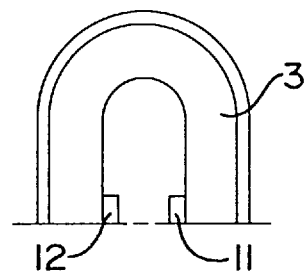

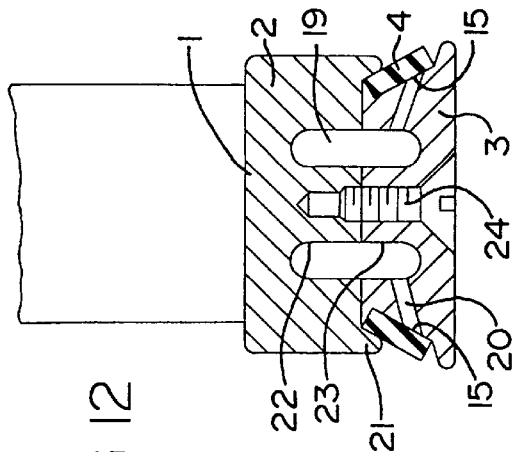
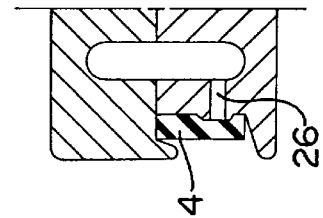
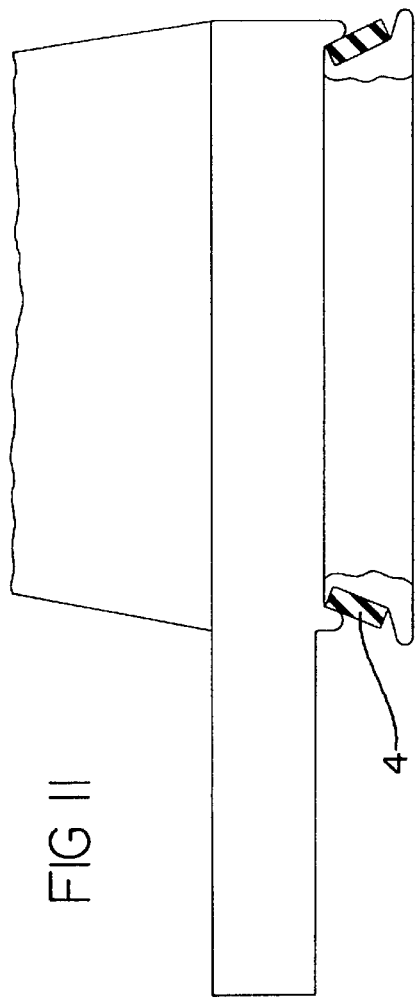
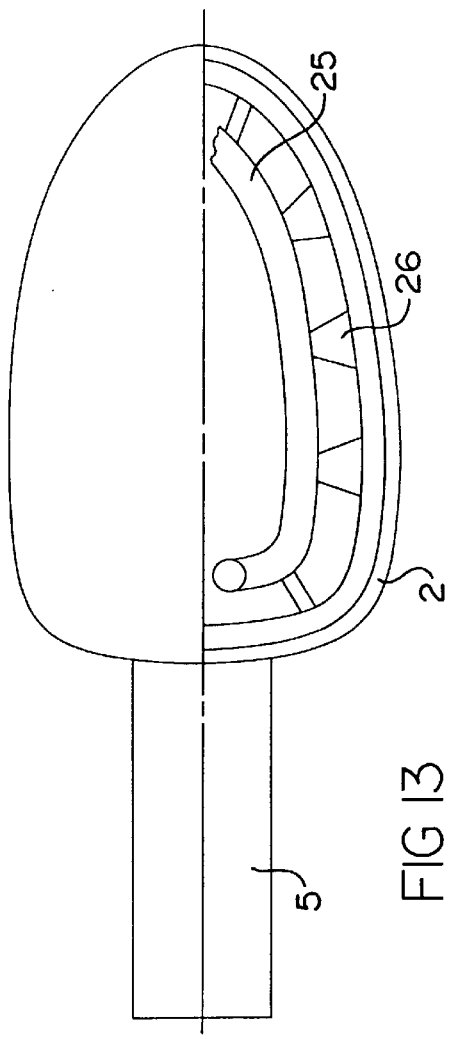

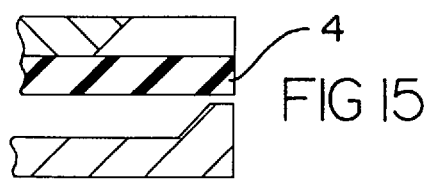
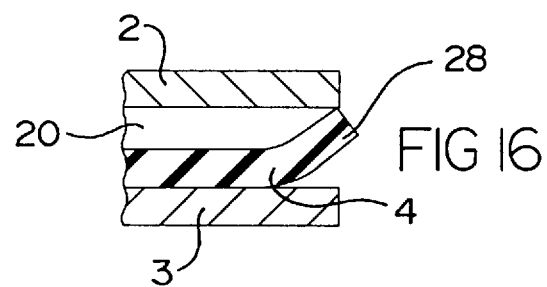
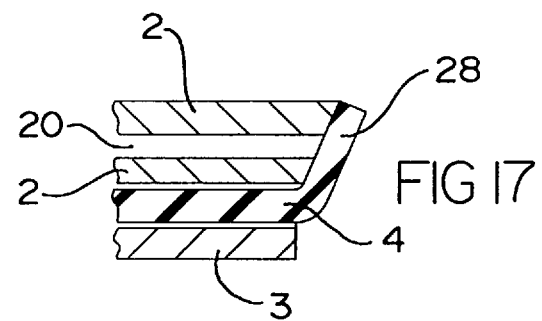

MULTIPLE NOZZLE WITH ONE-PIECE SEAL FOR WINDSHIELD WASHER SYSTEMS

TECHNICAL FIELD

The present invention relates to a nozzle housing for a spraying device of a windshield washer system with multiple nozzles.

BACKGROUND OF THE INVENTION

DE-OS 39 07 980 discloses a windscreen washer system with a spraying device comprising several nozzles made of elastic material. Because the direction of the jet coming from the nozzle elements should be adjustable, they are contained in movable nozzle units arranged in a common nozzle housing. The movability of the nozzle elements requires a relatively complicated structure of the nozzle housing.

DE-OS 35 03 496 discloses a nozzle housing with a nozzle that is achieved by a simple bore through the wall of the nozzle housing, the bore being then connected to a central channel. The execution of the bores requires a considerable expenditure e of time and work. Furthermore, the bores must have a certain diameter and it is difficult to clean them when they are clogged.

DE-OS 18 00 013 discloses a nozzle housing made of elastic material so that the nozzle can expand under the pressure of the cleaning liquid to eject dirt particles. The function of this nozzle housing is similar to that described in DE-OS 30 07 980, but is applicable for a single nozzle.

According to U.S. Pat. No. 3,940,068 the nozzles for a spraying device are formed by inserting a cover-type nozzle element into the nozzle housing which represents the completing part of the channel walls being provided as open channels on the surface of the nozzle housing. The advantage of this configuration is in particular, that the channels can be executed in a comparatively simple manner and that it is possible to clean the outlets of the nozzles without difficulty by simply removing the nozzle element for a short time. A disadvantage of the nozzle housing known from U.S. Pat. No. 3,940,068 is that the nozzles have a fixed diameter and that it is not possible to clean them when the nozzle element is fastened in the nozzle housing in order to prevent an inadvertent removal.

Aim of the present invention is to create a nozzle by simple means the aperture of which depends on the pressure of the sprayed cleaning liquid. The particular advantage of such nozzles is that they are self-cleaning since the obstructing particles can be ejected through the opening nozzle due to the increasing pressure of the obstructing particles. Furthermore, such nozzles can be configured in such a way that they are closed in normal conditions so that the antifreeze cannot evaporate and any ice formations which form thereon are blown off under the pressure of the cleaning liquid by means of the movable nozzle element.

The present invention consists of a part of the nozzle being formed by the housing itself, while the movable part of the nozzle is formed by a section of the elastic member deforming under the pressure of the cleaning liquid. Thus it is possible to form one or even several nozzles only by means of a single elastic member, preferably an elastic seal, which abuts on a surface, particularly the edge of the aperture of the nozzle housing, and opens the way for the liquid by deforming under the pressure of the cleaning liquid.

With this embodiment of the present invention, the same effect as described in DE-OS 39 07 980 with regard to the duckbill-type nozzle elements is achieved by simple means. If a major surface shall be moistened with liquid for the washing procedure it is known to arrange several nozzles at a certain distance from each other on the nozzle housing (see, for example, DE-OS 39 07 980).

Thus, a single elastic member, preferably in a flat seal, forms a part of all side walls of all desired nozzles. According to the present invention, several nozzles can therefore be formed by means of a single seal which results in a relatively simple and cheap construction of a multiple nozzle unit.

The single nozzles can be distributed circularly on the circumference of a nozzle element. A particularly simple construction is achieved by the present invention due to the cylindrical shape, the nozzle elements can be arranged on the divided circumferential surface of the body.

In a preferred embodiment the parts of the nozzle housing are coupled together, consisting of retaining member and cover, simply by screw-type or lock-type engagement.

A further simplification can be achieved by providing the cover with a fitting for the fastening of a hose pipe which delivers the cleaning liquid.

Since the windshield to be washed should be moistened especially in the area of the wipers, it is recommended, as already known, to fasten the nozzle housing on the wiper arm. The two locking arms of the clip can embrace directly the wiper arm, as described in U.S. Pat. No. 3,940,068. As additional safety device a web can be used in order to prevent the housing from sliding from the wiper arm, which therefore serves at the same time as additional safety device for the snap-in connection. Even this web can be fastened in a snap-in connection with the locking arms of the housing. The web itself can be formed in one piece, yet flexible, on one of the locking arms. It is also possible to fasten the nozzle housing on the motor hood.

As already mentioned, single areas of the seal can be assigned to single nozzles of a multiple nozzle. The areas of the seal not directly forming a part of the nozzle are retained by projections of the nozzle housing in such a way that the are preloaded preferably in the closing direction of the nozzle. In a preferred embodiment, the nozzle housing is provided with recesses adjacent to the apertures. This feature allows the aperture of the nozzle to be opened sufficiently despite the compressed seal. According to this, space is left with regard to the area of the housing positioned near the nozzle aperture, so that the elastic element can freely move in order to open the nozzle diameter.

In another preferable embodiment, the nozzle unit is provided with a central channel, preferably connected with the fitting, from which single channels extend leading to the respective nozzle. Preferably, the channels extend essentially perpendicular to the outer surface. According to another aspect of the present invention the web and/or the cover includes projections with mating abutment areas for clamping the retaining member formed as seal and thus provide for the preload necessary to close the apertures in case of unpressurized washing liquid.

A particularly simple manner of fastening the cover on the retaining member is accomplished by including snap-in projections in the bars of the cover.

An increase of the stability of the nozzle unit is described in the present invention. The connection of the two elements of the nozzle unit can be achieved in a simple way. In preferred configurations the seal which is common to all nozzles is positioned flatly in the plane of the nozzles. Another possibility, described in the favorable development of the present invention and consists in positioning the seal at a certain angle with regard to the channels leading to the nozzle apertures, preferably around the circumferential surface of the cylindrical housing.

In another favorable embodiment, the seal is structured in such a way that it extends, in its border area, at a certain angle to the central area of the sealing surface. In this case, the areas of the seal being under self-preload can serve for closing the nozzle apertures.

BRIEF DESCRIPTION OF THE DRAWINGS

FIGS. 1 to 10 show sections and different views or partial views of a first embodiment of the present invention.

FIGS. 11 and 12 show a second embodiment of the present invention represented partly in a section and partly in a sketch.

FIGS. 13 and 14 show a third embodiment represented partly in a section and partly in a sketch.

FIGS. 15 to 17 show further embodiments for the arrangement of the seal between cover and retaining device in sections and sketches.

DETAILED DESCRIPTION OF THE PREFERRED EMBODIMENTS

FIG. 1 shows a nozzle housing 1 consisting essentially of a cover 2, a retaining member 3 and a seal 4. The injection-molded plastic cover 2 is provided with a cast-on fitting 5 for the hose pipe delivering the cleaning liquid. The cover 2 is preferably injection-molded. The retaining element 3 is connected with the cover 2 by means of locking projections 6, projecting from cover 2 and locking in locking arms 8 of the retaining member 3 by means of latches 7.

The injection-molded plastic retaining member 3 is provided with two cast-on locking arms 8,9 (see also FIGS. 5, 8 and 9). By means of the locking arms 8 and 9, the nozzle housing 1 can be fastened on a wiper arm in the known manner. Additionally, one of the locking arms (for example locking arm 8) can be provided with a cast-on flexible web 10 for safety reasons, which can be locked with regard to the other locking arm 9 thus preventing the nozzle housing 1 from separating from the wiper arm under the effect of the wind or other forces.

Instead of the single latches 7 on the projections 6, a circumferential locking ring can be employed, as described in FIGS. 2, 4 and 8, being retained by projections 6 which are distributed at a certain distance from each other on the circumference of the cover 2.

FIG. 1 shows one of several possible projections 11 on the retaining member 3 in abutment on a respective recess of cover 2 and thus centering the cover 2 with regard to the retaining member 3 and defining the distance of the two components of the nozzle housing to each other. FIGS. 9 and 10 show a second projection 12.

As can be seen in FIGS. 6 and 7, the seal 4 has essentially the shape of a longitudinally extended ring or "O".

The nozzle housing 1 is provided with a central channel 18 connected with the supply tube 13 in fitting 5, from which derive single channels 14 terminating in apertures 15. These apertures are closed by parts of the outer area of the seal 4. The border of the seal 4 is, as can be seen in FIG. 1 above and below, clamped between projections of the retaining member 3 oriented towards the inside and the inner surface of the cover 2. The apertures 15 are configured in such a way that they can deflect under the force of the cleaning liquid leaving the nozzle and reach a position indicated by 16.

FIG. 2 shows the cover 2 seen from above, the areas of the seal 4 forming a movable part of the nozzle being visible below the apertures 15. The locking projections 6 are interrupted at the level of the apertures 15 in order to open the way for the liquid flowing out of the nozzle. FIG. 3 shows a section through the cover 2 approximately at the level of projection 11 in FIG. 1. The recesses in which are inserted the projections 11, 12 of the retaining element 3 are clearly depicted.

FIG. 4 shows a view of the inside of the cover 2 and the inlet 17 of the delivery tube 13 to the central channel 18. FIG. 5 shows a view of the nozzle housing of FIG. 1 in the direction from the top to the bottom. FIG. 6 shows a section through the seal 4 according to FIG. 7. It can be seen that the seal is provided with a certain preload due to which it is normally somewhat curved, when it is not mounted. FIG. 8 is a top view on the nozzle housing 1 according to FIG. 1, from left to right, the two locking arms 8 and 9 being clearly depicted.

FIG. 9 shows a section through the retaining member 3 with the locking arms 8 and 9 and the projections 11 and 12. Finally, FIG. 10 is a top view on the retaining member 3 according to FIG. 9.

FIGS. 11 and 12 show a second configuration of a nozzle housing with a circular central channel 19, from which single channels 20 derive in a star-shaped manner being formed in retaining member 3. The seal 4 is positioned circularly before the apertures 15 of channels 20, thus closing them elastically with their inner surface area. Due to the pressure of the cleaning liquid the aperture is opened in a nozzle-type way. A circumferential projection 21 on cover 2 embraces the parts of the circular seal and fastens them this way.

As can be seen from FIG. 12, two central projections 22, 23 of cover 2 and retaining member 3 are positioned adjacent to each other. A screw connection 24 acting on the central projections screws the two elements of the nozzle housing together.

FIGS. 13 and 14 show a further embodiment of the present invention indicating an essentially circular central channel 25 in cover 2 from which single channels 26 derive in a fan-shaped manner. The fastening of seal 4 according to FIG. 14 differs from FIG. 12 only in that the seal 4 is perpendicular to the channels 26, while the channels 20 in FIG. 12 are inclined with regard to seal 4.

FIGS. 15, 16 and 17 indicate further possibilities for the configuration of the aperture of the nozzles. The solution according to FIG. 15 corresponds in many points to that shown in FIGS. 1 to 10 and therefore is not explained in detail.

FIG. 16 is more simple insofar as housing 2 and retaining element 3 are provided with smooth surfaces with regard to channel 20. However, this solution requires a preload of seal 4 which in the unloaded normal state leads to an angular position of the outer area of the seal 4. Thus, by the pressure of the cleaning liquid in channel 20, the seal can be brought elastically into a less curved position in which the water passes through the open nozzle. Another embodiment of the present invention is shown in FIG. 17 in which the seal 4 is compressed between smooth areas of cover 2 and retaining member 3. Due to the preload of the outer area 28 of the seal the channel 20 is closed elastically.

We claim:

1. Nozzle unit including a rigid nozzle housing for housing a spraying device, said nozzle housing provided with at least one channel for delivering a cleaning liquid, said channel terminating in apertures opening to the atmosphere and positioned on an outer surface of the nozzle housing, comprising:

an elastic nozzle element retained in the housing, said elastic nozzle element including several apertures, each with a dimension that is altered by the pressure of the delivered cleaning liquid, the apertures forming a corresponding number of nozzles by means of a seal which is common to all apertures.

2. Nozzle unit according to claim 1, wherein the nozzles are all lying at the same level and that the elastic nozzle element has a circular shape.

3. Nozzle unit according to claim 1, wherein the housing has a circumferential surface along which the nozzles are distributed at a predetermined distance to each other.

4. Nozzle unit according to claim 1, wherein the housing is divided and consists of a retaining element with a cover in positive engagement.

5. Nozzle unit according to claim 4, wherein the cover is provided with a fitting for the tube foreseen for the delivery of the cleaning liquid, connected with the channel.

6. Nozzle unit according to claim 4, wherein the retaining element is provided with a locking element for a lock-type engagement with a wiper arm, the locking element preferably provided with a web which can be in locking engagement with the sides of the locking element and embraces thus the wiper arm or a projection on the motor hood.

7. Nozzle unit according to claim 4, wherein the essentially circular seal is clamped by means of webs of the cover or the retaining element, the walls of the webs delimiting laterally the corresponding channels.

8. Nozzle unit according to claim 4, wherein the cover includes bars which are provided with snap-in projections by which the cover can be locked with the retaining element.

9. Nozzle unit according to claim 4, wherein the housing includes a central channel which has an annular shape and wherein the retaining element and the cover support each other by means of a projection of the retaining element or the cover forming an inner lateral wall of the central channel.

10. Nozzle element according to claim 1, wherein a circumferential border area of the seal extends angularly with regard to a flat central area due to the preload of the seal, the border area being in abutment with the aperture and closing it when the cleaning liquid is not under pressure.

11. Nozzle unit according to claim 1, wherein the seal is embraced by corresponding projections of the nozzle housing and retained preferably with a preload in the closing direction of the nozzle.

12. Nozzle unit according to claim 1, wherein the nozzle housing is provided with recesses adjacent to the apertures providing for the freedom of movement of the seal when the nozzle opens.

13. Nozzle unit according to claim 1, wherein in the housing is foreseen a central supply channel, from which channels, extending essentially perpendicular to the outer surface, derive and terminate in the apertures.

14. Nozzle unit according to claim 1, wherein the seal has a substantially circular shape and is arranged perpendicular or inclined with regard to the channel terminating in the aperture.

* * * * *